United States Patent [19]

Oren, III

[11] Patent Number: 4,478,092
[45] Date of Patent: Oct. 23, 1984

[54] TEXTILE ROLL-WEIGHT GAUGE

[75] Inventor: Jess W. Oren, III, Washington Boro, Pa.

[73] Assignee: Armstrong World Industries, Inc., Lancaster, Pa.

[21] Appl. No.: 468,857

[22] Filed: Feb. 22, 1983

[51] Int. Cl.³ .............................................. G01L 5/00
[52] U.S. Cl. ................................ 73/862.55; 73/862.65
[58] Field of Search ........... 73/862.55, 862.65, 862.54; 33/182

[56] References Cited

U.S. PATENT DOCUMENTS 3,439,535  4/1969  McNeely et al. ................. 73/862.55
3,918,302  11/1975  Skelton et al. ................ 73/862.55 X
4,289,036  9/1981  Barker .......................... 73/862.65 X

FOREIGN PATENT DOCUMENTS 2066473  7/1981  United Kingdom ................. 33/182

Primary Examiner—Charles A. Ruehl
Assistant Examiner—Brian R. Tumm

[57] ABSTRACT

Disclosed is a gauge for measuring the weighting force on a textile cot roll. The gauge consists of a pair of pivoted levers having portions extending forwardly of the pivot point which include reduced-thickness ends thereon adapted to be inserted into an opening between a cot roll arbor and a drive roll therefor. The drive roll-contacting lever portion is forked. The arbor roll-contacting lever arm is mounted between the forked arms of the arbor roll-contacting lever and is offset from the pivot point. This allows the lever ends to separate when the rear portions of the lever arms are forced apart by a screw threaded element extending through the rear portion of one of the levers into contact with the opposing portion of the other lever. A strain gauge is mounted on the forwardly extending arm of the cot roll arbor-contacting lever to sense flexure thereof as a change in electrical resistance and is operably connected to an electronic readout instrument which translates changes in the electrical resistance into a weighting force on the textile cot roll when the cot roll is forced away from the drive roll by separation of the forward arm portions of the pivoted levers.

6 Claims, 3 Drawing Figures

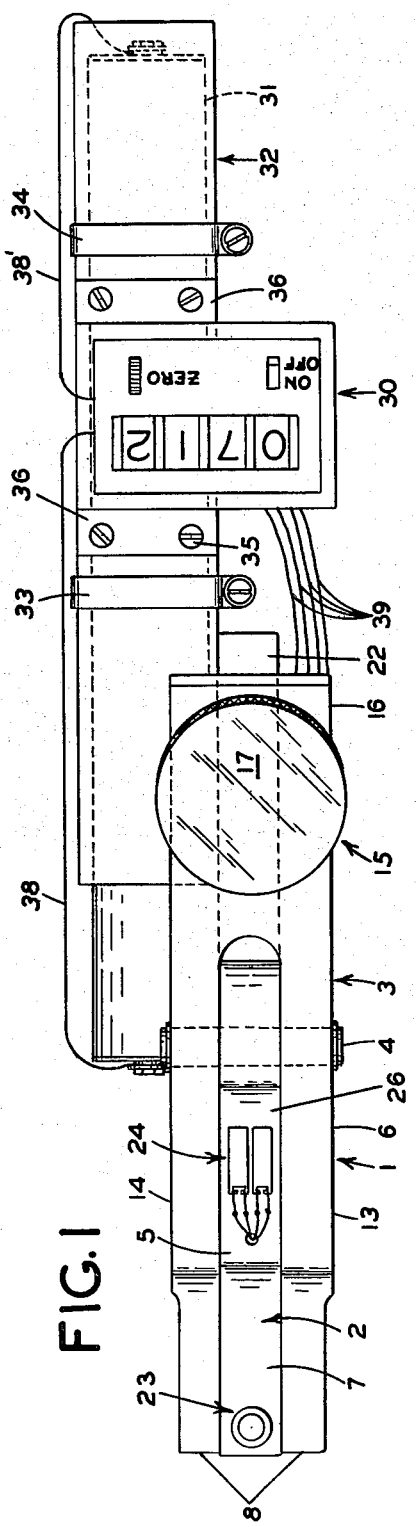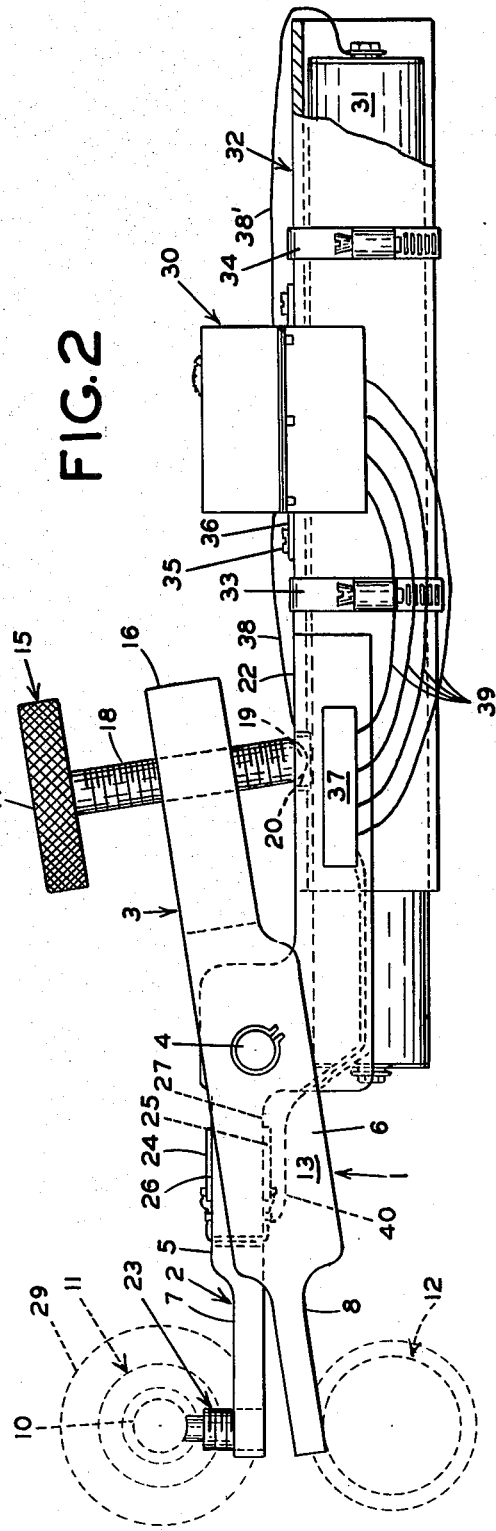

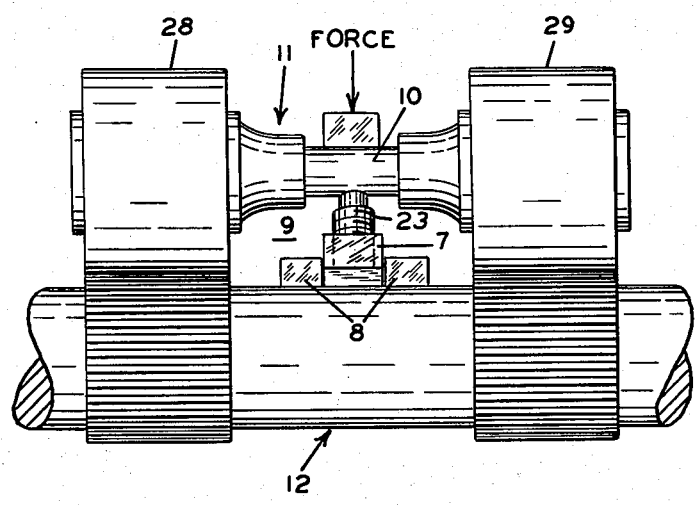

TEXTILE ROLL-WEIGHT GAUGE

BACKGROUND OF THE INVENTION

1. Field of the Invention

This invention relates to a gauge for measuring the weighting force on a textile cot roll. More specifically, the invention relates to such a gauge which is a small, preferably self-contained unit consisting of a pair of reverse scissors action pivoted levers so designed that the forward ends of the pair of lever arms may be inserted into an opening between a textile cot roll arbor and the drive roll therefor to physically push the cot roll away from the drive roll when the levers are pivoted around the pivot point. The load on the cots is thus transferred from the cots to the arbor-contacting lever arm. Electrical strain gauges mounted on the arbor-contacting lever arm are operably connected to an electronic readout instrument which translates changes in electrical resistance caused by flexure of the arbor-contacting lever arm into weighting force on the cot roll.

2. Description of the Prior Art

The yarn in a textile spinning frame passes between the surface of a cot, which is an elastomeric cylinder, and a fluted steel driving roll against which the cot rotates. A cot roll comprises an assembly of cots and the arbor upon which the cots are mounted. There are normally two cots on a roll, i.e., one on each end.

The magnitude of the frictional forces between the cot and the drive roll is of great concern as it must be controlled for proper gripping action by the cot on the fibers being drafted, and for satisfactory endurance of the elastomeric cot. In some frames this force is developed by manually-adjusted compression spring and toggle lever action. A coarse visual scale showing spring compression is normally the indicator used to estimate the weighting force that the spring action exerts upon the cot roll.

One of the gauges developed in the past to measure the force exerted on the cot rolls is shown in U.S. Pat. No. 3,090,227. The gauge disclosed in this patent is a wedge-type force gauge wherein the gauge is mounted on a metal bar, the underside of which has a beveled track upon which a slotted wedge rides. The screw means mounted in threaded openings in longitudinally spaced pieces projecting downwardly from the bottom of the metal bar on the end opposite that upon which the wedge is mounted is used to force the wedge between the steel drive roll and the arbor to lift the cot rolls. When the pressure has been removed from between the steel drive rolls and the cot rolls, a reading is taken from the force gauge and recorded as the front roll weight.

U.S. Pat. No. 4,289,036 discloses a gauge consisting of a three-pronged spring clip for measuring the mouth opening displacement of fracture toughness test specimens. A strain gauge is secured to the center prong so as to sense the flexure thereof as a change in electrical resistance. The strain gauge is connected to a meter which translates the change in electrical resistance into a measurement of the test specimen mouth during a fracture toughness test thereof.

No known prior art gauge has been developed which could be used by one operator, which would provide the accuracy of measurement desired, be small enough to be used in the limited space available in the textile frames where measurements must take place, be portable, be hand-holdable, and be a self-contained combination transducer and electronic roll-weight measurement gauge and which would enable the operator to quickly use and observe the gauge and the weighting force indicator simultaneously.

SUMMARY OF THE INVENTION

It is a general object of the invention to provide a small, portable, preferably self-contained combination transducer and electronic roll-weight measurement gauge which may be hand-held by an operator and inserted between a textile cot roll and a drive roll therefor to measure the weighting force on the cot roll. It is a further object of the invention to provide such a gauge which is uncomplicated, simple to operate, requires no disassembly of the machine parts in order to use it, provides a quick means for obtaining an accurate weighting force measurement, and is relatively inexpensive to produce.

In accordance with the above objects, the present invention in a gauge for measuring the weighting force on a textile cot roll includes a pair of pivoted levers mounted on a transverse pivot stud. The ends of the lever arms extending forwardly of the pivot point are adapted to be inserted between a cot roll arbor and a drive roll therefor. The forward portion of the lever arm adapted to contact the cot roll is offset with respect to the pivot point and is mounted between the forked portions of the drive roll-contacting arms of the other lever. Screw threaded means extending through one of the back lever arms into contact with the opposing lever arm is provided to force the forward arms of the levers apart and force the cot roll away from the drive roll. Strain gauges are mounted on the forwardly extending arm of the cot roll arbor-contacting lever to sense flexure thereof as a change in electrical resistance and are connected to an electronic readout instrument which translates changes in electrical resistance to weighting force on the textile cot roll when the cot roll is forced away from the drive roll by separation of the forward arms of the pivoted levers. The cot roll lifting anvil in the reduced end portion of the cot roll arbor-contacting lever is removable and various designs thereof may be used to accommodate various size openings between a drafting roll arbor and a drive roll therefor. An anvil is also provided to permit a dead-weight calibration of the strain gauge means.

The present invention solves the previously indicated problems of the prior art and provides an easy to use, uncomplicated, small gauge for measuring quickly and accurately the weighting force on a textile cot roll by even an unskilled operator.

BRIEF DESCRIPTION OF THE DRAWINGS

FIG. 1 is a top plan view of the gauge of this invention.

FIG. 2 is a side elevational view of the gauge of FIG. 1 shown in an exaggerated open position with the roll-separating ends thereof positioned between a textile roll arbor and the drive roll therefor, the rolls being shown, in dotted lines.

FIG. 3 is a front elevational view of a cot roll, the drive roll and end portions only of the roll-separating arms of the gauge of this invention as they would appear when inserted between the rolls.

DESCRIPTION OF THE PREFERRED EMBODIMENTS

Referring to the drawings, FIGS. 1 and 2 illustrate the preferred construction of the gauge of this invention for measuring the weighting force on the textile cot roll.

As shown in FIGS. 1 and 2, the gauge 1 comprises a pair of levers 2 and 3 which are mounted on a transverse pivot stud 4.

In textile spinning frame designs, the space or opening 9 between the neck portion 10 of the cot roll arbor 11 and the drive roll 12 therefor is very limited, which makes it difficult to insert a weighting force gauge therebetween. For this reason, portions 5 and 6 of the levers 2 and 3 extending forwardly of the pivot stud 4 are provided with reduced end portions 7 and 8 which are adapted to be inserted in the opening 9 (see FIG. 3) between the intermediate neck portion 10 of a cot roll arbor 11 and a drive roll 12 therefor. Arm 5 of cot roll-contacting lever 2 is offset with respect to the pivot stud 4 and is mounted between the pair of drive roll-contacting forked arms 13 and 14 of the forwardly extending portion 6 of lever 3. The screw threaded adjusting means 15 extends through the rearwardly extending portion 16 of lever 3 into contact with the rearwardly extending portion 22 of lever 2. As shown in FIG. 2, the adjusting means 15 consists of a knob 17 and a shank portion 18 having a semi-spherical end 19 thereon which is adapted to seat in a semi-spherical depression 20 in the top surface of the portion 22 of the lever 2. As is apparent, the function of the adjusting means 15 is to cause separation of the forwardly extending portions 5 and 6 of the levers 2 and 3. A lifting anvil 23 is removably mounted in the upper surface of the reduced end of portion 7 of the arm 5 of the lever 2. The replaceable lifting anvils have contoured roll-contacting surfaces which center themselves in the roll shaft. The contours may be varied as required to suit the various diameters and configurations of roll shafts that exist on spinning frames. Various anvil lengths may also be used so that when lifting occurs, the arc-swing of the transducer is kept at a minimum. If possible, the actual lifting distance of the transducer arm should be limited to $\frac{1}{4}$", maximum $\frac{3}{8}$". If more than this is needed, a more correct length anvil should be chosen. The threads on the anvil are loose-fitting so that they can turn slightly and align to the long axis of the shaft when the load is applied. A special anvil is also provided from which dead weights may be suspended for calibration of the strain gauge means. A pair of strain gauges 24, and another pair 25 are mounted on the top surface 26 and bottom surface 27 respectively of arm 5 of the lever 2 and are electrically connected by means of wires 40 to a terminal block 37 and thence to a signal conditioner and readout instrument 30 by means of wires 39 for converting resistance change from the strain gauges into voltage which is converted from an analog signal into digital form by converter stages. The digital signal is fed to the readout instrument also in 30.

Electrical power for the gauge 1 is obtained from batteries 31 secured in the container positioned in the handle 32 by means of worm gear clamps 33 and 34 and electrically connected with the signal conditioner and readout instrument 30 by wires 38 and 38' extending from terminals on opposite ends of the series of batteries 31. The readout instrument 30 is mounted on the handle 32 by means of screws 35 extending through a base plate 36.

In use, the adjusting means 15 is retracted and the forwardly extending arm portions 5 and 6 of the levers 2 and 3 are brought together sufficiently so that the reduced ends 7 and 8 thereof may be inserted into the opening 9 between the neck portion 10 of the cot roll arbor 11 and the drive roll 12. The adjusting screw 15 is then turned clockwise thus forcing arms 5 and 6 of levers 2 and 3 to separate, lifting anvil 23 into contact with the neck portion 10 of the cot roll arbor 11. At the same time the reduced end portions 8 of the forked arms 13 and 14 are brought into contact with the drive roll 12. Further clockwise rotation of the adjusting screw 15 causes the arbor roll 11 to be forced upwardly until the cots 28 and 29 are separated from the drive roll 12. To obtain an accurate measurement of the weighting force on the cot roll, it should be lifted only to the point where the cot can be turned against the fluted drive roll by hand with a minimum of friction. The weighting force exerted on the arm 5 at this point causes flexure thereof and a change in the electrical resistance of the strain gauges 24 and 25, mounted on the top surface 26 and bottom surface 27 respectively thereof. This change in the electrical resistance is translated into weighting force on the cot roll in the manner previously described and this is indicated on the electronic readout instrument 30. Because the gauge is small, self-contained, and capable of being hand-held, the operator can easily observe both the gauge and the weighting force measurement immediately and then make any necessary adjustments to increase or decrease the weighting force on the cot roll.

Although the gauge with the present invention as described is preferably in the form of a self-contained unit, it is contemplated that the gauge may also be used with any separate signal conditioning unit and recording instrument which is connected by a suitable flexible cable.

While the preferred configuration of the gauge 1 is as described herein, it should be understood that the present disclosure is made by way of example and that variations are possible without departing from the subject matter coming within the scope of the following claims.

What is claimed is:

1. A gauge for measuring the weighting force on a textile cot roll comprising:
    (a) first and second pivoted levers mounted on a transverse pivot stud, said levers having shaped body portions extending forwardly and rearwardly of said pivot, said forwardly extending portions of said levers having end portions adapted to be inserted in an opening between a movably mounted cot roll arbor and a fixed drive roll therefor;
    (b) means for moving the levers about the pivot stud to separate the forwardly extending body portions of said levers to lift the cot roll arbor away from the drive roll when inserted therebetween;
    (c) strain gauge means secured to the forwardly extending portion of said first lever and adapted to sense flexure thereof as a change in electrical resistance; and
    (d) means connected to said strain gauge means for translating changes in electrical resistance to weighting force on the textile cot roll.

2. A gauge for measuring the weighting force on a textile cot roll according to claim 1 wherein the ends of the forwardly extending portions of the levers each have a thickness less than the remainder of their body portions.

3. A gauge for measuring the weighting force on a textile cot roll according to claim 2 wherein the forwardly extending portion of the second lever has a forked configuration, the body of the first lever includes an intermediate portion which extends downwardly from the forwardly extending portion thereof to the rearwardly extending portion, and wherein the first lever is mounted between the forks of the second lever by means of the pivot stud installed through transverse openings in the forks of the second lever and the intermediate portion of the first lever.

4. A gauge for measuring the weighting force on a textile cot roll according to claim 3 including means installed in the upper surface of the reduced thickness end portion of the first lever adapted to contact the cot roll arbor, said means being removable to facilitate the use of various designs thereof to accommodate various sizes of openings between the cot roll arbor and the driving roll therefor.

5. A gauge for measuring the weighting force on a textile cot roll according to claim 4 wherein the means for moving the levers about the pivot stud comprises an adjustable screw threaded element extending through the rearwardly extending portion of the second lever into contact with the top surface of the rearwardly extending portion of the first lever.

6. A gauge for measuring the weighting force on a textile cot roll according to claim 5 including a handle attached to the rearwardly extending portion of said first lever, electrical power means mounted in said handle, said means for translating changes including a read-out indicator instrument mounted on said handle, said read-out instrument being operated by said changes in electrical resistance in said strain gauge means to indicate the weighting force on said cot roll.

* * * * *